United States Patent [19]  
King

[11] 3,900,441  
[45] Aug. 19, 1975

[54] ZINC AND MOLYBDENUM-CONTAINING COMPOUNDS AS SMOKE DEPRESSANTS FOR POLY(VINYL CHLORIDE) RESIN COMPOSITIONS

[75] Inventor: Thomas Y. King, Lancaster, Pa.

[73] Assignee: Armstrong Cork Company, Lancaster, Pa.

[22] Filed: July 10, 1974

[21] Appl. No.: 487,175

Related U.S. Application Data

[63] Continuation-in-part of Ser. No. 340,271, March 12, 1973, abandoned.

[52] U.S. Cl. .................. 260/31.8 HA; 260/31.8 R; 260/42.49; 260/45.75 P; 260/45.75 R; 260/45.75 W
[51] Int. Cl. .................. C08f 45/56; C08f 45/62
[58] Field of Search ........... 260/31.8 R, 31.8 HA, 260/45.75 W, 45.75 R, 45.75 P, 42.49; 260/117/138

[56] References Cited
UNITED STATES PATENTS

| | | | |
|---|---|---|---|
| 2,855,266 | 10/1958 | James | 117/36.8 |
| 3,272,663 | 9/1966 | Kronstein | 260/45.75 |
| 3,326,832 | 6/1967 | Rauschenbach et al. | 260/45.75 |
| 3,418,267 | 12/1968 | Busse | 260/45.75 |
| 3,766,157 | 10/1973 | Parts | 260/880 |
| 3,819,577 | 6/1974 | McRowe | 260/45.75 |
| 3,821,151 | 6/1974 | Mitchell | 260/45.75 |

Primary Examiner—V. P. Hoke

[57] ABSTRACT

The propensity of poly(vinyl chloride) homopolymer and poly (vinyl chloride) copolymer resin-containing compositions to smoke on exposure to fire is greatly diminished by the addition of effective amounts of mixtures of zinc compounds and molybdenum compounds, which have the molybdenum metal ion in the 6 plus valence state, or zinc molybdate. Based on 100 parts by weight resin, mixtures containing 0.2 to 7 parts by weight zinc metal plus 0.3 to 10 parts by weight molybdenum metal have been found effective. Also from 0.5 to 7 parts by weight zinc molybdate has been found effective. In the case of the mixtures, the minimum total effective weight of zinc and molybdenum metal is about 0.8 parts with a maximum of about 10 parts, based on 100 parts by weight resin, and, in the mixtures, the zinc to molybdenum metal ion weight ratio is preferably less than about 2:1.

9 Claims, 1 Drawing Figure

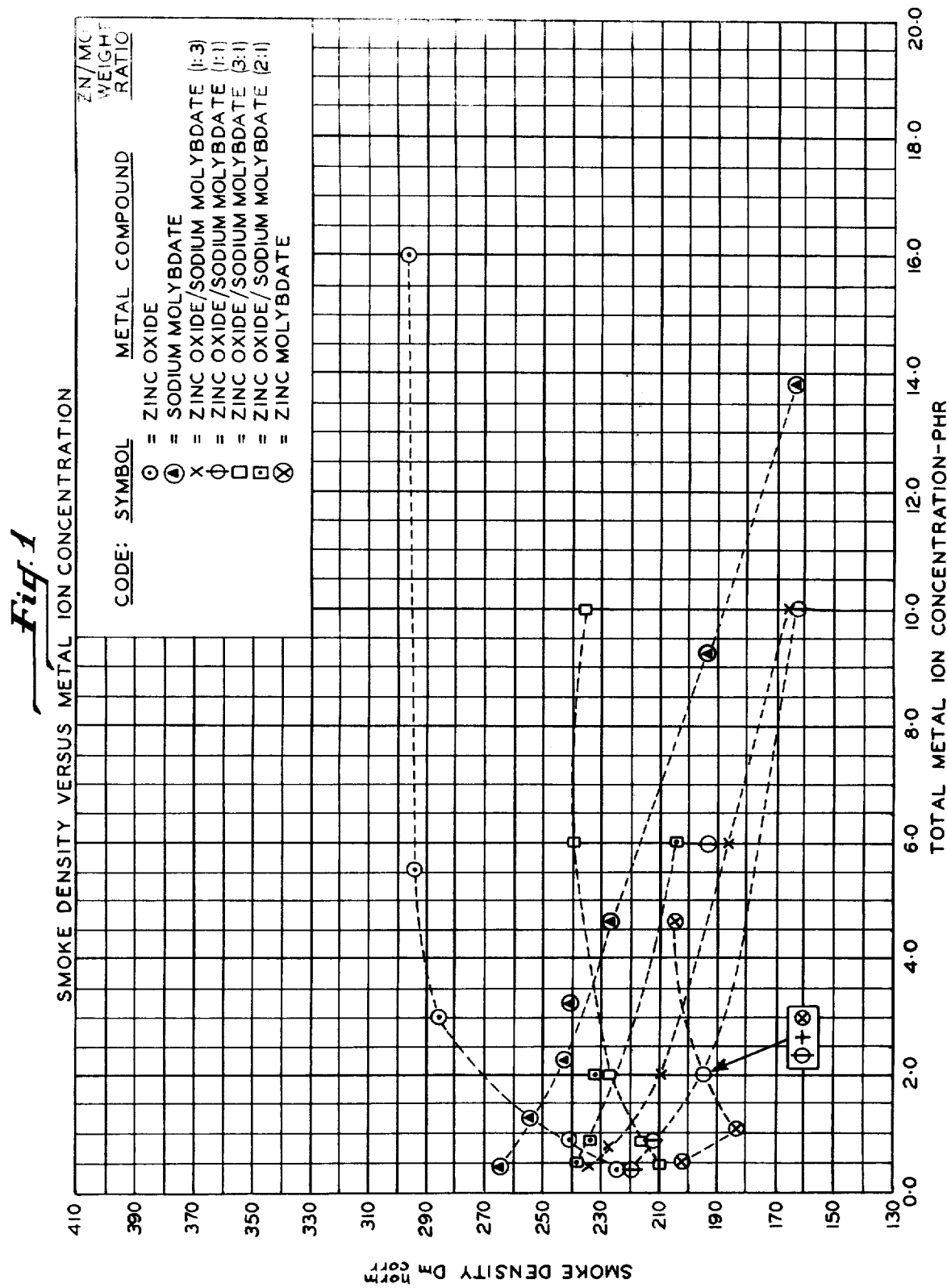

ZINC AND MOLYBDENUM-CONTAINING COMPOUNDS AS SMOKE DEPRESSANTS FOR POLY(VINYL CHLORIDE) RESIN COMPOSITIONS

CROSS-REFERENCE TO RELATED APPLICATION

This is a continuation-in-part of application Ser. No. 340,271 filed Mar. 12, 1973 now abandoned.

BACKGROUND OF THE INVENTION

1. Field of the Invention

This invention relates generally to reducing the hazards of fire and, more specifically, to the control of the smoking propensities of poly(vinyl chloride) homopolymer and copolymer resin-containing compositions so that, on exposure to fire, such resin compositions generate significantly less smoke.

2. Description of the Prior Art

It is known from U.S. Pat. No. 3,560,441 to add antimony trioxide to resinous compositions, including those containing poly(vinyl chloride) homopolymers and copolymers for the purpose of imparting flame retardancy and low smoke characteristics to such compositions. The use of various oxides including those of zinc and iron to aid in forming a char when a polyamide is at its pyrolysis temperature is also known from U.S. Pat. No. 3,418,267.

SUMMARY OF THE INVENTION

Recent evaluation of the pyrolysis products of poly(vinyl chloride) including homopolymers and copolymers copolymerized with minor amounts of monomers such as vinyl acetate has shown that among the principal products are benzene and toluene, both of which are known contributors to smoke. It has now been found that the addition of small but effective amounts of metallic oxides to poly(vinyl chloride) containing compositions significantly reduces the amount of benzene and toluene emitted during pyrolysis and apparently catalyzes the breakdown to other compounds such as to increase the amount of $C_1$–$C_6$ aliphatic hydrocarbons formed at the expense of benzene and high molecular weight aromatic hydrocarbons.

This study has also shown that, unexpectedly, a combination of zinc compounds and molybdenum compounds, in which the molybdenum metal ion is in the 6 plus valence state, results in the most significant reduction in the amount of smoke generated. Smoke data obtained showed that the amount of smoke generated is less when the mixture of zinc and molybdenum compounds are used than when either metal is used alone at similar metal concentrations. Zinc molybdate which contains both metals in the same compound, when used as a smoke suppressant, also resulted in compositions having a significantly greater smoke reduction.

DESCRIPTION OF THE DRAWING

FIG. 1 is a graph in which smoke density of poly(vinyl chloride) compositions versus metal ion concentration in such compositions is measured and curves for zinc oxide, sodium molybdate, zinc molybdate, and zinc oxide sodium molybdate compound mixtures are plotted.

DESCRIPTION OF THE PREFERRED EMBODIMENTS

In many fires, the contribution of burning materials to the smoke generated can be as critical as the contribution of burning materials to the fires themselves. Since poly(vinyl chloride) homopolymer and copolymer compositions are widely used in building materials it is desirable to lower the propensity of such compositions to generate smoke on being exposed to flame.

Publications have suggested that various metallic oxides be used as fire retardants in resinous compositions, and it has been recognized that antimony trioxide acts to reduce the amount of smoke generated by poly(vinyl chloride) containing compositions. Seemingly contrary to this teaching, among many metal oxides tested, the ability of antimony trioxide to act as an effective smoke suppressant with poly(vinyl chloride) homopolymer and copolymer resin compositions is disappointing. Among the best of the metal oxides tested were ferric oxide and zinc oxide, two oxides which had been suggested for use as fire retardants in resinous compositions in the prior art. The use of ferric oxide suffers a severe disadvantage in that ferric oxide (yellow, red, or brown pigment) adds color to any resinous composition with which it is formulated. Surprisingly, the most significant reduction in the amount of smoke generated by a plasticized poly(vinyl chloride) formulation was obtained when a mixture of zinc oxide and a molybdenum compound having the molybdenum metal ion in the 6 plus valence state was utilized. The same formulations which contained only a zinc compound or only a molybdenum compound generated considerably more smoke on being exposed to a flame. It was also surprising to find that zinc molybdate, which contains both metals in the same compound, also resulted in a significant smoke reduction, greater again than those for compounds containing either zinc or molybdenum by itself.

Among useful zinc compounds are zinc oxide, zinc carbonate, zinc silicofluoride, all inorganic zinc compounds, and zinc 2-ethylhexonate. Examples of molybdenum metal-containing compounds useful in the practice of this invention are sodium molybdate, ammonium molybdate, potassium molybdate, barium molybdate, lithium molybdate, calcium molybdate, cadmium molybdate, all inorganic molybdenum containing compounds, and molybdenyl acetyl acetonate. These compounds may all be used in admixtures with zinc oxide or other zinc compounds for improved smoke reduction. It appears that it is the combination of the zinc metal ion together with the molybdenum metal ion which contributes to lower smoke evolution.

The method used for measuring smoke generated by the plasticized poly(vinyl chloride) resin-containing compositions is the method described in "Method for Measuring Smoke From Burning Materials" by D. Gross et al.; ASTM Special Technical Publication No. 422 (1967), and the measurements were made on a Model 4-5800, Aminco-NBS Smoke Density Chamber, American Instrument Company. The values given throughout are average values taken from two or more tests.

In each of the examples that follow, phr means parts by weight per hundred parts by weight resin.

EXAMPLE I

Zinc oxide (0.500 phr) and molybdenum trioxide (0.603 phr) were mixed into a poly(vinyl chloride) dry-blend formulation containing 100 parts poly(vinyl chloride) homopolymer resin (Opalon 610), 40.0 phr di-2-ethylhexyl phthalate and 2.0 phr Mark 275 stabilizer. Smoke data obtained on films of this formulation were 41.4% lower than the control which contained no smoke suppressant, while those from films containing only zinc oxide or molybdenum trioxide at this concentration were 35.7% and 24.8% lower respectively than the control. When zinc molybdate was used as the smoke suppressant (1.5 phr) in the same dryblend formulation, a film prepared from said formulation showed a 48.3% smoke reduction.

At 1.5 phr, zinc molybdate provides equal or greater smoke reduction than ferric oxide at any of the concentrations tested. Zinc molybdate (white powder) has the advantage over ferric oxide in that it does not add color to the formulation.

Table I

| Sample No. | Modifications | Dm Norm Corr.[1] | % Smoke Reduction |
|---|---|---|---|
| Control | | 350 | — |
| A | Zinc oxide 0.500 phr[2] | 225 | 35.7 |
| B | Molybdenum trioxide 0.603 phr | 263 | 24.8 |
| C | Zinc oxide 0.500 phr plus molybdenum trioxide 0.603 phr | 205 | 41.4 |
| D | Zinc molybdate 1.50 phr | 181 | 48.3 |

[1]Dm Norm Corr. refers to the average of the smoke-density maximums corrected for photocell residue and normalized for similar sample weights.
[2]Zinc oxide at 0.500 phr has reached its maximum effectiveness as a smoke suppressant. A further increase in concentration results in increased smoke.

EXAMPLE 2

Three additional zinc and three additional molybdenum (+6 valence) containing inorganics were tested as mixed systems and as individual components in a formulation of 100 phr Opalon 610, 40 phr di-2-ethylhexyl phthalate, and 2 phr M-275 stabilizer prepared as described in Example I. Additive levels and smoke results shown in Table II indicate that the use of mixed metal systems resulted in a lower average smoke density than the use of the individual metal containing compounds where the metal ion level was 1.0 phr. When the individual metal ion level was raised to 2.0 phr the use of mixed systems still provided lower average smoke densities in all but one instance, that being the use of barium molybdate at the 2 phr metal ion level which provided slightly lower average smoke densities than the mixed system. Even so, in all instances improvements were obtained over the use of zinc compounds at all levels tested and adjustments between metal ion levels in the mixtures would readily optimize reduction of smoke evolution.

Table II

COMPARISON OF SMOKE GENERATION FROM MIXED METAL-CONTAINING SYSTEMS WITH THAT FROM INDIVIDUAL COMPONENTS
Formulation

| Component A (phr)+ | Component B (phr)+ | norm* Dm corr |
|---|---|---|
| $ZnCO_3$ (1.92) | $K_2MoO_4$ (2.47) | 225 |
| $ZnCO_3$ (1.92) | — | 291 |
| $ZnCO_3$ (3.84) | — | 299 |
| — | $K_2MoO_4$ (2.47) | 337 |
| — | $K_2MoO_4$ (4.94) | 297 |
| ZnS (1.49) | $BaMoO_4$ (3.09) | 237 |
| ZnS (1.49) | — | 325 |
| ZnS (2.98) | — | 299 |
| — | $BaMoO_4$ (3.09) | 266 |
| — | $BaMoO_4$ (6.18) | 223 |
| $ZnSiF_6 \cdot 6H_2O$ (4.83) | $Li_2MoO_4$ (1.81) | 241 |
| $ZnSiF_6 \cdot 6H_2O$ (4.83) | — | 308 |

Table II-Continued

COMPARISON OF SMOKE GENERATION FROM MIXED METAL-CONTAINING SYSTEMS WITH THAT FROM INDIVIDUAL COMPONENTS
Formulation

| Component A (phr)+ | Component B (phr)+ | norm* Dm corr |
|---|---|---|
| $ZnSiF_6 \cdot 6H_2O$ (9.66) | — | 329 |
| — | $Li_2MoO_4$ (1.81) | 321 |
| — | $Li_2MoO_4$ (3.62) | 286 |
| Control | — | 370 |

+The concentration of metal-containing additives was calculated so that in all cases 1.00 phr or 2.00 phr of the metal ion by weight was added.
*Refers to the average of triplicate test corrected for photocell residue and normalized for weight (4.0 grams).

In the drawing in FIG. I, the smoke density versus the metal ion concentration is plotted for various poly(vinyl chloride) resin compositions containing varying amounts of metal additives. The metal compound additives are identified by the symbols shown in the drawing under the "Code" and, where zinc oxide is used in combination with sodium molybdate, the ratio of zinc metal ion weight to molybdenum metal ion weight is given. The smoke densities are plotted versus the total metal ion concentration in phr.

The vinyl dryblend formulation from which films were formed for smoke density measurements contained 100 parts by weight of a poly (vinyl chloride) (Opalon 610) homopolymer resin, 40 parts by weight of di-2-ethylhexyl phthalate and 2 parts by weight of a tin stabilizer. Tests were conducted in the NBS Smoke Chamber under flaming conditions. Results were normalized for weight, averaged and plotted in FIG. I.

As shown in FIG. I, minimum smoke density is obtained at a relatively low concentration of zinc oxide in the vinyl films. A further increase in zinc oxide concentration results in an increase in smoke density. This increase continues until the level of zinc oxide is high enough to act as a diluent and a plateau is reached.

The smoke suppressant effect of sodium molybdate is observed to be a sharp smoke reduction at relatively small concentrations followed by a more gradual reduction at higher levels. Apparently, both the smoke suppressant and diluent effect contribute to low smoke at the high levels of sodium molybdate.

When using mixtures of zinc oxide and sodium molybdate at a zinc to molybdenum metal ion weight ratio of 3:1, a minimum smoke density is again obtained at low metal concentration. This minimum is lower than that found for zinc oxide although the total metal concentration is the same. A further increase in total concentration of the mixture results in a smoke increase due to the higher levels of zinc being used in the mixtures.

At zinc to molybdenum metal ion weight ratios of 2:1, 1:1 and 1:3, curves are lower than for either the zinc oxide or sodium molybdate curve after about 1.0 phr total of the mixture of metal ions. Increasing the concentration of the mixtures leads to reduced smoke levels, which appears to be approaching a limit at 10 phr total of the additive mixture.

Also illustrated in FIG. 1 is the smoke suppressant effect of zinc molybdate at various concentrations.

These results indicate that the mixture of zinc and molybdenum compounds effectively lowers smoke in typical vinyl formulations better than either metal alone at similar metal concentrations. Results suggest that any inorganic zinc-containing compound or inorganic molybdenum-containing compound (of plus 6 valence state) will reduce smoke in vinyl formulations as will zinc-molybdate.

Based on 100 parts by weight of poly(vinyl chloride) homopolymer of copolymer, from about 0.2 to 7 parts by weight of zinc metal together with about 0.3 to 10 parts by weight of molybdenum metal (the molybdenum metal ion being in the 6 plus valence state) acts as an effective smoke suppressant for plasticized poly(vinyl chloride) formulations. The total metal content in the mixtures (zinc plus molybdenum) may vary from about 0.8 to 10 parts by weight per 100 parts resins.

From 0.5 to 7 parts by weight of zinc molybdate effectively acts as a smoke suppressant for the same type of formulations.

In order to achieve more flame retardant resinous compositions, halogenated plasticizers may be substituted for plasticizers such as di2-ethylhexyl phthalate.

Improved effectiveness for the molybdenum compounds can be achieved by adding solutions of the compounds to the resin when blending.

What is claimed is:

1. A poly(vinyl chloride) homopolymer or copolymer resinous composition, wherein said copolymer comprises a major portion of vinyl chloride, containing, as a smoke suppressant, based on 100 parts by weight resin:

a. a mixture of zinc and molybdenum compounds containing between about 0.2 to 7.0 parts by weight zinc metal from zinc compounds selected from the group consisting of inorganic zinc compounds and zinc 2-ethylhexonate and between about 0.3 to 10.0 parts by weight molybdenum metal from molybdenum compounds having the molybdenum ion in the six plus valence state and selected from the group consisting of inorganic molybdenum compounds and molybdenyl acetyl acetonate, the total zinc to molybdenum metal weight ratio being less than about 2:1 with the total weight of the metal ions in said mixture being between about 0.8 parts and 10 parts by weight; or b. 0.5 to 7 parts by weight zinc molybdate.

2. The resinous composition in accordance with claim 1 wherein the resin is a plasticized poly(vinyl chloride).

3. The resinous composition in accordance with claim 1 wherein the smoke suppressant is a mixture of zinc oxide and molybdenum trioxide.

4. The resinous composition in accordance with claim 1 wherein the smoke suppressant is a mixture of zinc oxide and sodium molybdate.

5. The resinous composition of claim 1 wherein the smoke suppressant is zinc molybdate.

6. The resinous composition in accordance with claim 2 wherein the plasticizer is halogenated.

7. The resinous composition of claim 2 wherein the smoke suppressant is a mixture of zinc oxide and molybdenum trioxide.

8. The resinous composition of claim 2 wherein the smoke suppressant is a mixture of zinc oxide and sodium molybdate.

9. The resinous composition of claim 2 wherein the smoke suppressant is zinc molybdate.

* * * * *